UNITED STATES PATENT OFFICE.

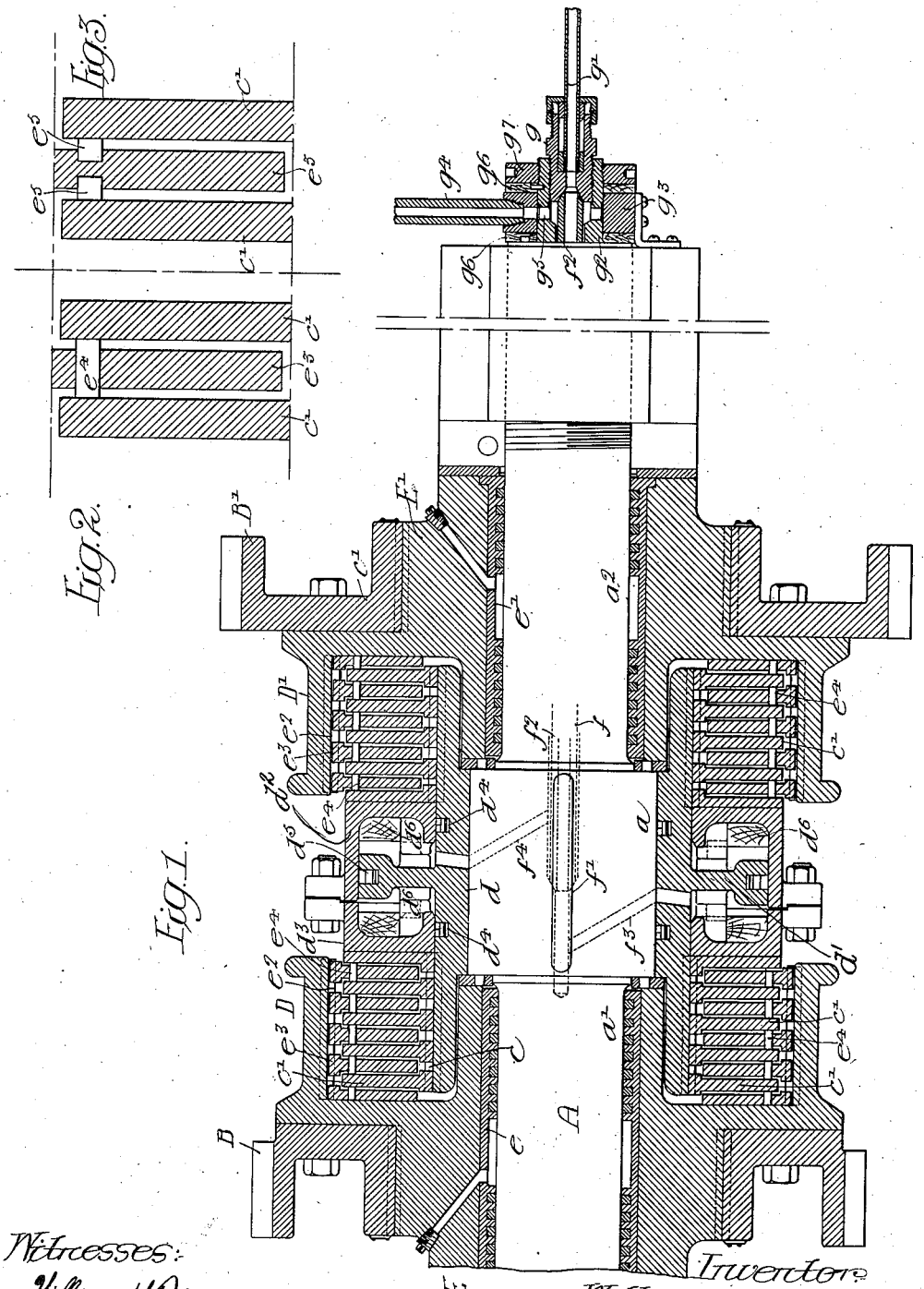

WILLIAM J. HAGMAN, OF PHILADELPHIA, PENNSYLVANIA, ASSIGNOR TO NILES-BEMENT-POND COMPANY, OF PLAINFIELD, NEW JERSEY, A CORPORATION OF NEW JERSEY.

CLUTCH MECHANISM.

No. 857,393.            Specification of Letters Patent.            Patented June 18, 1907.

Application filed September 14, 1905. Serial No. 278,492.

*To all whom it may concern:*

Be it known that I, WILLIAM J. HAGMAN, a citizen of the United States, residing in Philadelphia, Pennsylvania, have invented certain Improvements in Clutch Mechanism, of which the following is a specification.

The main object of my invention is to provide certain improvements in the detail construction of the pneumatic clutching mechanism employed particularly in connection with planer drives, and among the advantageous results which I desire to attain may be named a saving in the volume of compressed air required to operate a clutch of a given size and a reduction of the mass of revolving metal in the clutch mechanism, whereby a quicker reversal of the planer driving shaft is made possible. I also desire to reduce the space occupied by a clutch mechanism of a given capacity, and further wish to provide an improved arrangement of the means whereby fluid under pressure is introduced in the mechanism to operate the same.

Another object of my invention is to provide a novel and advantageous arrangement of friction blocks for the plates of the clutch whereby it is possible to renew and adjust said blocks with a minimum expenditure of time and labor.

These advantageous results, together with other desirable improvements, I secure as hereinafter set forth, reference being had to the accompanying drawings, in which:

Figure 1, is a vertical section taken through the main shaft of a planer and through the clutch mechanism thereon, illustrating the novel features of my invention; Fig. 2, is a vertical section on an enlarged scale and illustrating the mounting of the friction blocks in the clutch plates, and Fig. 3, is a vertical section illustrating a modification of the construction shown in Fig. 2.

In the above drawings, A represents the main shaft of the drive, which may be turned in either direction according as to whether it is operated from the gear wheel B or from the gear wheel B', which are turned in opposite directions by any desired motor. The device by which this is accomplished preferably consists of the parts shown in the figures and includes a pair of clutches D and D' by which either of said gear wheels may be operatively connected to the shaft A. The intermediate portion $a$ of the shaft is of larger diameter than the two portions $a'$ and $a^2$ and has keyed to it a sleeve $d$, which overhangs both of the smaller portions and has on it a piston $d'$ which in the present instance is formed integral with it. Said piston operates in a cylinder formed by two castings $d^2$ and $d^3$ suitably bolted together to make an air tight casing which is slidably mounted upon the sleeve $d$. For the purpose of preventing leakage of fluid between the sleeve and the cylinder, packing rings $d^4$ are placed in suitable annular recesses formed in the sleeve so as to engage suitable surfaces of the ends of the cylinder, the periphery of the piston being of relatively great width to provide for the reception of another packing ring $d^5$.

In order to reduce the clearance spaces in the cylinder and at the same time keep down the mass of metal in the reversible parts to the lowest permissible point, I place within each end of the cylinder a series of wooden blocks $d^6$, and, these, by filling the space which could never be occupied by the piston, reduce the amount of air necessary to fill the cylinder, and in view of the inherent lightness of the wood of which they are made, do not increase the inertia of the shaft A and its attached parts, which has to be overcome each time the direction of rotation of said shaft is reversed. The portions of the sleeve $d$ on each side of the cylinder $d^2$, $d^3$, are provided with series of keys $c$, preferably independent of the material of said sleeve, and upon these are slidably mounted series of clutch disks $c'$—there thus being a set of said disks on each side of said cylinder.

The gear B is bolted or otherwise fixed to a casting E mounted upon a graphite bushing $e$ on the portion $a'$ of the shaft A, while the gear B' is similarly mounted upon a casting E' carried upon a graphite bushing $e'$ on the portion $a^2$ of said shaft. Both of these castings E and E' have portions which extend under the overhung parts of the sleeve $d$, so that ample bearing for their respective gears is secured in spaces which would otherwise be required for the support of said sleeve, in addition being provided with portions overhanging the clutch plates $c'$ on the sleeve. These overhanging parts have keys $e^2$ upon which are slidably mounted clutch rings or plates $e^3$, so arranged as to alternate with the plates $c'$.

The plates $e^3$ are preferably provided with a series of transverse holes placed adjacent to their peripheries and having loosely mounted in them a series of wooden plugs or friction blocks $e^4$ of such length that they project beyond the faces of the plates and engage the adjacent faces of the plates $c'$ when the clutch is operated.

In order to transmit the motive fluid for the operation of the clutches D and D', I form in the shaft A a passage or conduit $f$ in the line of the axis of said shaft; this passage extending from one end of said shaft to a point adjacent to the cylinder $d^2$, $d^3$. At a point near the inner end of this passage I form a conical seat $f'$ and place in the passage a pipe $f^2$ having its end tapered to form an air tight joint with said beveled seat and its opposite end similarly beveled to fit the seated end of a stuffing box $g$ adapted to be connected to a pipe $g'$ of a fluid controlling valve. It will be understood that the external diameter of the pipe $f^2$ is less than the internal diameter of the passage $f$ so that there exists an annular conduit outside of said pipe.

It will be understood that the stuffing box $g$ is carried on a tubular piece $g^2$ fixed in any desired manner to the end of the shaft A, and there is also mounted upon this piece a non-rotatable ring $g^3$ having in it a radially placed passage communicating with the pipe $g^4$, also connected to the controlling valve. The passage in said ring is so placed as to always remain in communication with the interior of the annular chamber surrounding the pipe $f^2$ through an annular passage $g^5$ in the piece $g^2$; there being washers $g^6$, preferably formed of wooden rings soaked in oil, interposed between the end of the shaft and the ring $g^3$ and between said ring and a nut $g^7$ screwed onto the end of the piece $g^2$.

The interior of the pipe $f^2$ is connected at its inner end with the cavity of the clutch cylinder in the casting $d^3$ through a passage $f^3$, while the space communicating with the pipe $g^4$ and around the outside of the pipe $f^2$ connects with the cavity in the cylinder $d^2$.

With this arrangement of parts any desired form of controlling valve may be so operated as to supply air or other suitable motive fluid under pressure through pipe $g'$ and the shaft A, and if the gears B and B' be turned in opposite directions, then said motive fluid will pass from the pipe $g'$ to the interior of the pipe $f^2$, throught the passage $f^3$, and into the cavity of the cylinder formed in the casting $d^3$. As a consequence, the cylinder will be moved bodily toward the gear B and the blocks or plugs $e^4$ on the various rings $e^3$ of the clutch D will be gripped between the plates $c'$, so that the sleeve $d$ and consequently the shaft A and its attached mechanism will be turned in one direction by the shaft D. If, now, the motive fluid be exhausted through the pipe $g'$ and fluid under pressure be supplied through pipe $g^4$, it will flow through the annular space surrounding the pipe $f^2$, through passage $f^4$ into the cylinder cavity within the casing $b^2$, with the result that said cylinder will be bodily moved toward the gear B', and since such movement will cause the plugs $e^4$ in the plates $e^3$ of the clutch B' to be gripped between the alternating plates $c'$ of said clutch, the direction of rotation of the sleeve $b$, and with it also the shaft A, will be reversed, since said parts will be driven by the gear B'.

It will be seen that with the above described arrangement of parts the gears B and B' are much closer together, than has hitherto been considered possible when a pair of automatic clutches are employed for reversing the direction of the driven shaft and consequently the space occupied by the clutch mechanism is materially less, though the diameters of the various parts have not been materially increased. It will also be noted that the volume of air required to operate the clutches is reduced to a minimum, owing to the small clearance in the cylinder. In addition, the means for introducing the air to the two ends of said cylinder is relatively simple and of such a nature as to require but little attention under operating conditions.

If desired, the plugs $e^4$, instead of being mounted in holes extending completely through the plates $e^3$, as in Fig. 2, may be carried in recesses formed in the faces of said plates as shown in Fig. 3 at $e^5$; it being obvious that in any case it is a comparatively simple matter to replace the blocks when this is required on account of wear. In putting new plugs in place it is only necessary that they shall be the same length and have their engaging faces perpendicular to their long axes.

I claim as my invention:

1. The combination of a pair of fluid operated clutches and a cylinder and piston for actuating the same, with a shaft provided with two concentric passages respectively connected to the two ends of the cylinder, a non-revoluble ring carried on an extension of the shaft and having an interior annular recess connected to a fluid supply pipe and in communication with the exterior of said concentric passages, a pipe in line with the line of the inner of said passages, and a stuffing box carried by the shaft for making an air tight connection between said pipe and said inner passage, substantially as described.

2. A driving mechanism for planer platens comprising a hollow clutch shaft operatively connected with the platen, two reversely rotating clutch barrels mounted loosely on said shaft, co-operating clutch disks operatively connected respectively with each barrel and the clutch shaft, a central air pipe arranged axially within the clutch shaft, an axially movable shifting cylinder arranged between the disks of the two clutches and having opposite ends connected by branch passages with bores of the clutch shaft and the central pipe, a piston operatively connected with the clutch shaft and arranged in said cylinder between said branch passages, a stationary air box receiving said clutch shaft and having an air chamber connected with the bore of said shaft, a branch air pipe connected with the chamber of said air box, a branch air pipe connected with the central air pipe, and packings arranged between the bore of said air box and the periphery of said shaft on opposite sides of the air chamber.

In testimony whereof, I have signed my name to this specification, in the presence of two subscribing witnesses.

WILLIAM J. HAGMAN.

Witnesses:
 WALTER CHISM,
 JOS. H. KLEIN.